US012657026B2

(12) United States Patent
Du Bois et al.

(10) Patent No.: US 12,657,026 B2
(45) Date of Patent: Jun. 16, 2026

(54) AUTOMATIC FUSION OF ARITHMETIC IN-FLIGHT INSTRUCTIONS

(71) Applicant: Intel Corporation, Santa Clara, CA (US)

(72) Inventors: Kristof Du Bois, Aalst (BE); Wim Heirman, Ghent (BE); Stijn Eyerman, Evergem (BE); Ibrahim Hur, Portland, OR (US); Jason Agron, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/848,284

(22) Filed: Jun. 23, 2022

(65) Prior Publication Data

US 2023/0418612 A1      Dec. 28, 2023

(51) Int. Cl.
*G06F 9/30*      (2018.01)

(52) U.S. Cl.
CPC ...... *G06F 9/30181* (2013.01); *G06F 9/30036* (2013.01)

(58) Field of Classification Search
None
See application file for complete search history.

(56)                References Cited

U.S. PATENT DOCUMENTS

| | | | | |
|---|---|---|---|---|
| 6,609,191 | B1 * | 8/2003 | Hooker | G06F 9/3853 |
| | | | | 712/216 |
| 2003/0093652 | A1 * | 5/2003 | Song | G06F 9/3851 |
| | | | | 712/217 |
| 2009/0327657 | A1 * | 12/2009 | Sperber | G06F 9/30181 |
| | | | | 712/216 |
| 2020/0019402 | A1 * | 1/2020 | Walters | G06F 9/30181 |
| 2022/0100501 | A1 * | 3/2022 | Boyer | G06F 9/22 |

* cited by examiner

*Primary Examiner* — John M Lindlof
(74) *Attorney, Agent, or Firm* — Essential Patents Group, LLP

(57)                ABSTRACT

Techniques for automatic fusion of arithmetic in-flight instructions are described. An example apparatus comprises a buffer to store instructions to be issued to a functional unit for execution, and circuitry coupled to the buffer to combine two or more instructions from the buffer into a single combined instruction. Other examples are disclosed and claimed.

22 Claims, 15 Drawing Sheets

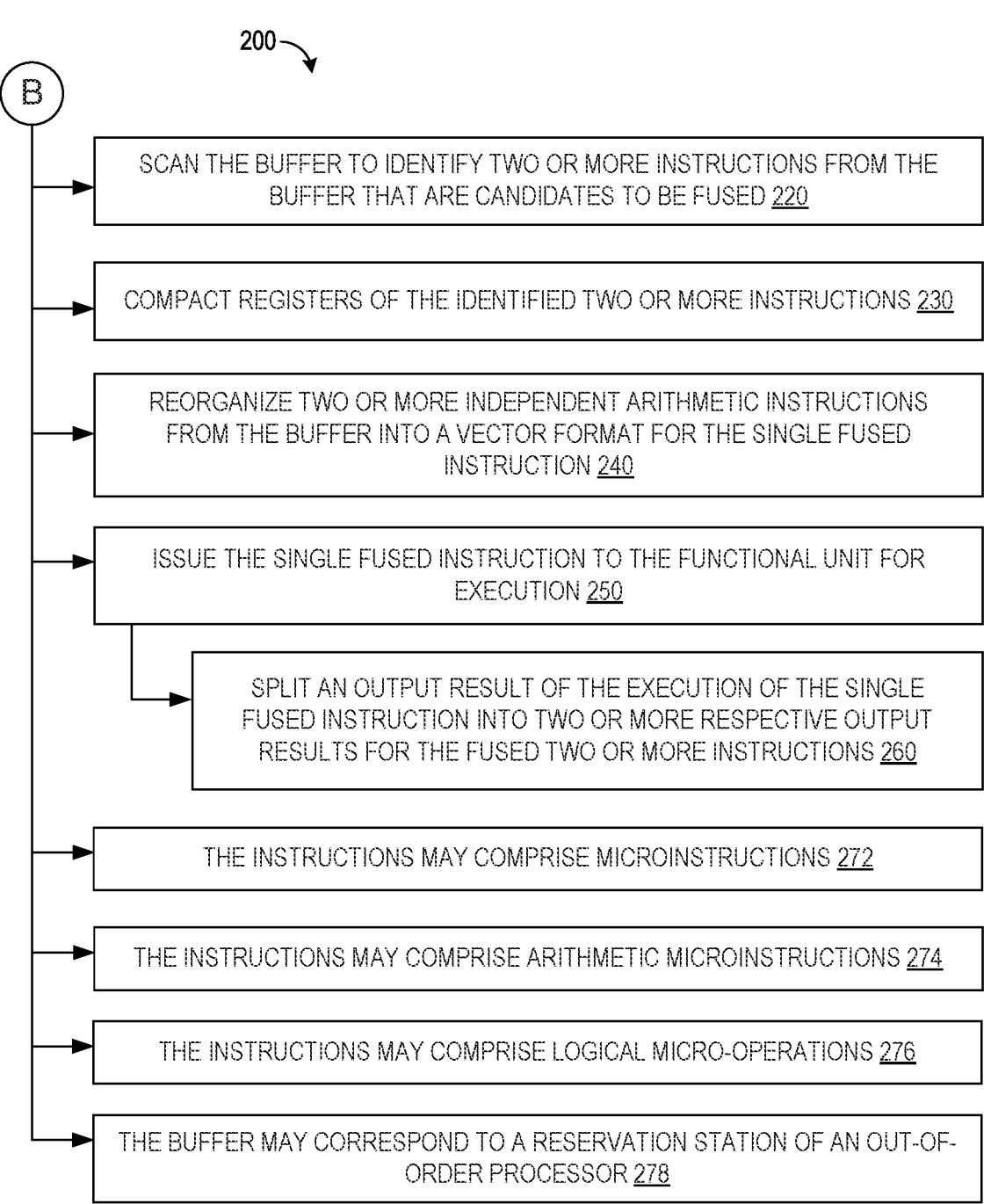

200

B

SCAN THE BUFFER TO IDENTIFY TWO OR MORE INSTRUCTIONS FROM THE BUFFER THAT ARE CANDIDATES TO BE FUSED 220

COMPACT REGISTERS OF THE IDENTIFIED TWO OR MORE INSTRUCTIONS 230

REORGANIZE TWO OR MORE INDEPENDENT ARITHMETIC INSTRUCTIONS FROM THE BUFFER INTO A VECTOR FORMAT FOR THE SINGLE FUSED INSTRUCTION 240

ISSUE THE SINGLE FUSED INSTRUCTION TO THE FUNCTIONAL UNIT FOR EXECUTION 250

SPLIT AN OUTPUT RESULT OF THE EXECUTION OF THE SINGLE FUSED INSTRUCTION INTO TWO OR MORE RESPECTIVE OUTPUT RESULTS FOR THE FUSED TWO OR MORE INSTRUCTIONS 260

THE INSTRUCTIONS MAY COMPRISE MICROINSTRUCTIONS 272

THE INSTRUCTIONS MAY COMPRISE ARITHMETIC MICROINSTRUCTIONS 274

THE INSTRUCTIONS MAY COMPRISE LOGICAL MICRO-OPERATIONS 276

THE BUFFER MAY CORRESPOND TO A RESERVATION STATION OF AN OUT-OF-ORDER PROCESSOR 278

RESERVATION STATION 420 vaddps xmm0, xmm1, xmm2
vsubsd xmm10, xmm11, xmm12
vaddps xmm3, xmm4, xmm5
vmulsd xmm20, xmm21, xmm22
...

INSTRUCTION FUSION 410

Scanning Reservation station 412 vaddps xmm0, xmm1, xmm2
vaddps xmm3, xmm4, xmm5

Compacting registers 414

| | 256 bits | |
| | 128 bits | 128 bits |
| ymm0 | xmm2 | xmm5 |
| ymm1 | xmm1 | xmm4 |
| ymm2 | xmm0 | xmm3 |

Fused instruction 416 vaddps ymm2, ymm1, ymm0

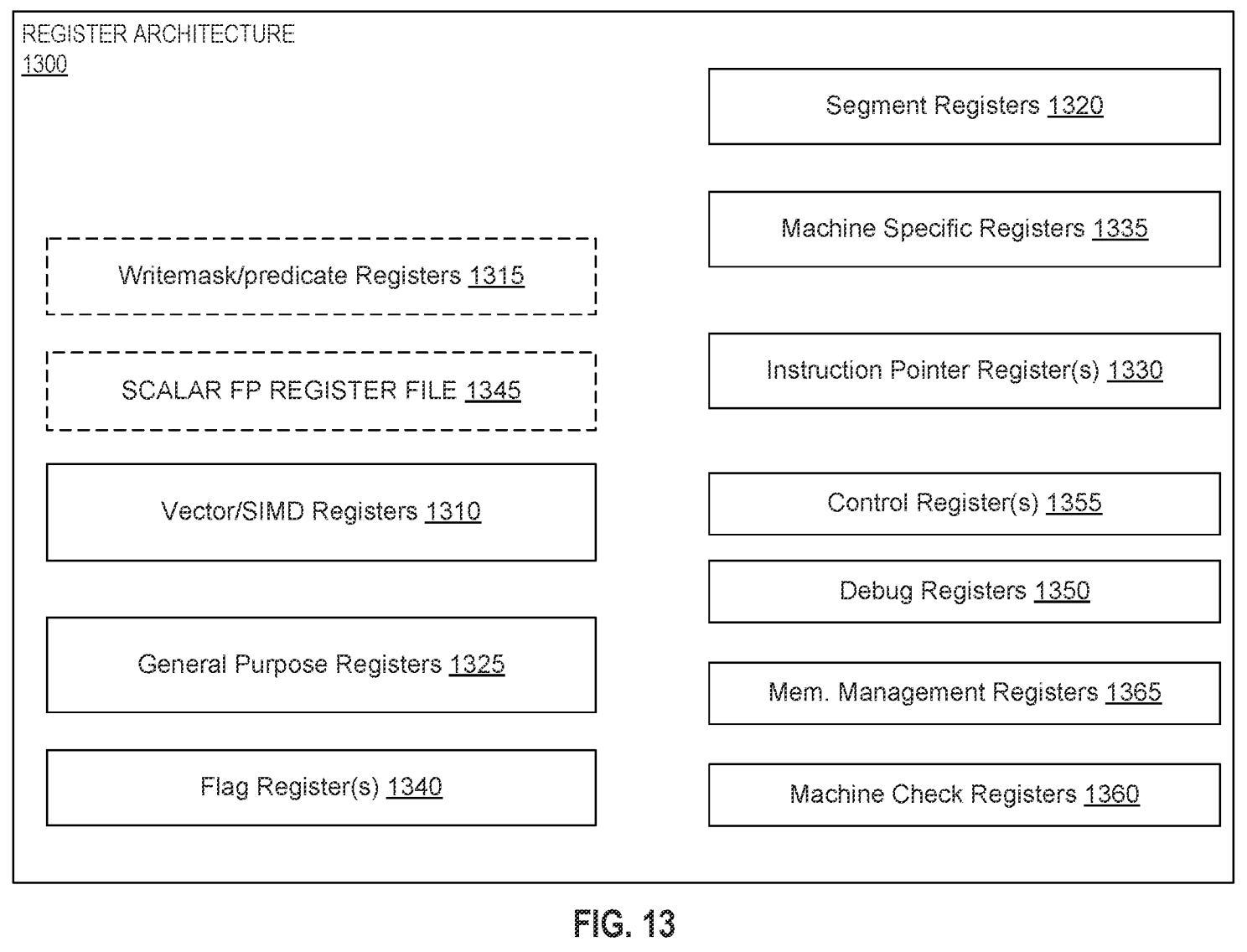

REGISTER ARCHITECTURE 1300

Segment Registers 1320

Machine Specific Registers 1335

Instruction Pointer Register(s) 1330

Control Register(s) 1355

Debug Registers 1350

Mem. Management Registers 1365

Machine Check Registers 1360

Writemask/predicate Registers 1315

SCALAR FP REGISTER FILE 1345

Vector/SIMD Registers 1310

General Purpose Registers 1325

Flag Register(s) 1340

FIG. 13

AUTOMATIC FUSION OF ARITHMETIC IN-FLIGHT INSTRUCTIONS

BACKGROUND

A vector processor may implement a vector instruction set that operates on vectors of multiple data elements. The number of data elements may be referred to as the vector length. For vector processing, both the instructions and the data may be pipelined to reduce fetch and/or decode time. In general, relatively wide vector registers are utilized and the various vector operations occur between vector registers. A single-instruction-multiple-data (SIMD) processor may implement a SIMD instruction set that performs the same instruction on multiple data elements. Some processors support both sequential and parallel instruction sets. Some processors include separate coprocessors for the sequential and parallel instruction sets.

BRIEF DESCRIPTION OF DRAWINGS

Various examples in accordance with the present disclosure will be described with reference to the drawings, in which:

FIGS. 2A to 2B are illustrative diagrams of an example of a method for fusing in-flight instructions in one implementation.

FIG. 13 is a block diagram of a register architecture according to some examples.

DETAILED DESCRIPTION

Figure 1:
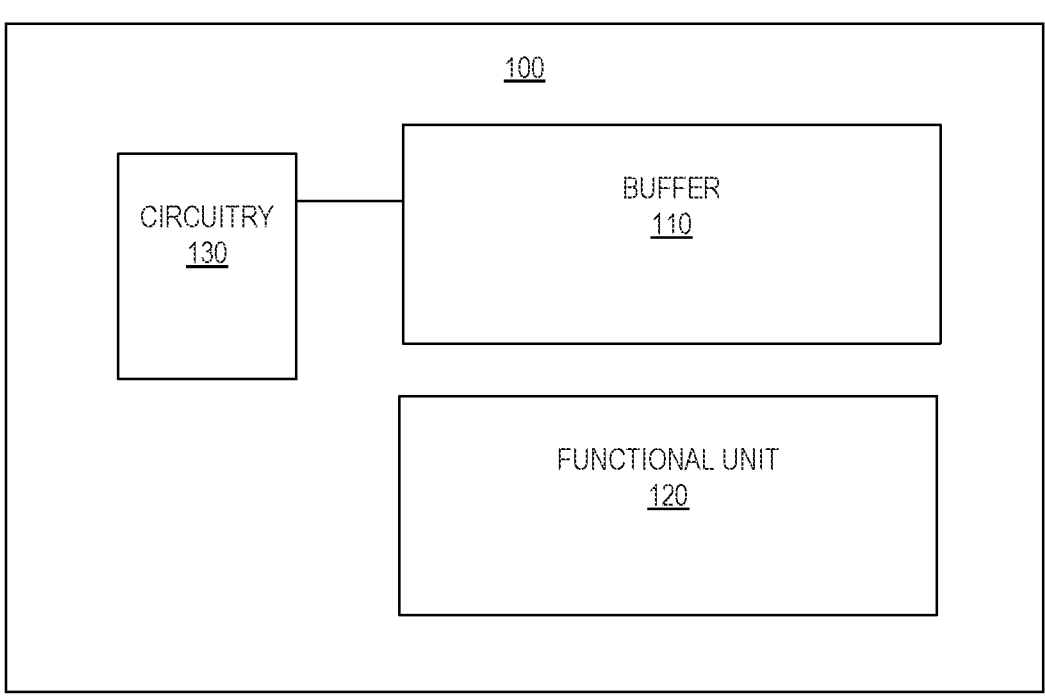
FIG. 1 is a block diagram of an example of an apparatus that includes instruction fusion technology in one implementation.

The present disclosure relates to methods, apparatus, systems, and non-transitory computer-readable storage media for automatic fusion of arithmetic in-flight instructions. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide automatic fusion of arithmetic in-flight instructions.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A;

B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some examples may provide technology for automatic fusion of arithmetic in-flight instructions. For any of a wide variety of reasons, instructions may be pending for execution with operands that do not occupy the full width of a register set available for operation on such operands. For example, the availability of vector instructions and their corresponding wide registers poses new challenges to application developers and compilers. In some environments, either the compiler is relied on to reorganize instructions in the application and replace them with vector instructions, or major efforts are required from the application developer to reformat the code and possibly use inline assembly in the program to utilize vector instructions. In order to benefit from these new features, the application has to be recompiled, and in some cases the application has to be modified, sometimes even at an algorithmic level.

A problem is that such recompilation and modification is a non-trivial task, and therefore, many workloads do not heavily use an available vector processing unit from hardware, resulting in a big performance gain that is left on the table. Another problem is that applications may have a complicated control flow and effective vectorization of the code of such applications is difficult for compilers. Also, not all compilers have support for vectorization of the compiled code. Accordingly, relying on the compiler can lead to poorly vectorized code for some applications. Most software developers are not able to reformat their codes or add inline assembly, simply because their applications are too complex, or they lack the expertise or opportunity to effectively implement vector instructions. Another reason for not recompiling software is because users may want a single binary to support a large set of processor generations (e.g., including processors that do not support vector instructions).

Another approach may involve an additional complicated software component that compacts the instructions in a workload to a VLIW (Very Long Instruction Word) format that can then be executed by a VLIW-capable processor. Macro-operation fusion is another approach that tries to fuse adjacent macro-ops with dependencies (such as test and jump instructions) early in the processor pipeline, prior to decoding. Vector widening is another approach that uses a binary translation (BT) system that is designed to perform speculative widening to both existing vectorized code and scalar code.

A problem is that, because macro-operation fusion happens early in the processor's pipeline, only instructions that are adjacent to each other (right next to each other, with no instruction in between) may be merged because the number of concurrent instructions are very limited at that point of the pipeline. Another problem is that vector widening requires detailed region analysis and code generation. Additionally, vector widening may involve memory-disambiguation logic in order to do the vector widening operations safely (i.e., in the face of potential aliasing). Even with well optimized modifications and/or recompilation, VLIW technology, macro-operation technology, and/or vector widening technology, instructions may still become pending for execution with operands that do not occupy the full width of a register set available for operation on such operands. Some examples overcome one or more of the foregoing problems.

In some examples, instruction fusion technology may utilize hardware to reorganize independent arithmetic instructions to a larger vectorized format. In some examples, instruction fusion technology may automatically fuse arithmetic instructions that are present in a reservation station of an out-of-order processor into vector instructions (e.g., and/ or SIMD instructions) by compacting the operands of the arithmetic instructions into available large registers. Advantageously, some examples may lead to fewer instructions that have to be executed by the processor, more effective usage of the vector processing unit, and/or a performance speedup for the workload.

FIG. 1 is an example of an apparatus 100 comprising a buffer 110 to store instructions to be issued to a functional unit 120 for execution, and circuitry 130 coupled to the buffer 110 to combine two or more instructions from the buffer 110 into a single combined instruction. For example, the circuitry 130 may be configured to scan the buffer 110 to identify two or more instructions from the buffer 110 that are suitable to be combined (e.g., fuse candidates). In some examples, the circuitry 130 may be configured to compact registers of the combined two or more instructions. For example, the circuitry 130 may be further configured to reorganize two or more independent arithmetic instructions from the buffer 110 into a vector format for the single combined instruction.

In some examples, the circuitry 130 may also be configured to issue the single combined instruction to the functional unit 120 for execution, and/or to split an output result of the execution of the single combined instruction into two or more respective output results for the combined two or more instructions. In some examples, the instructions may comprise microinstructions. In some examples, the instructions may comprise arithmetic microinstructions. In some examples, the instructions may comprise logical micro-operations. In some examples, the buffer 110 may correspond to a reservation station of an out-of-order processor.

Figure 14:
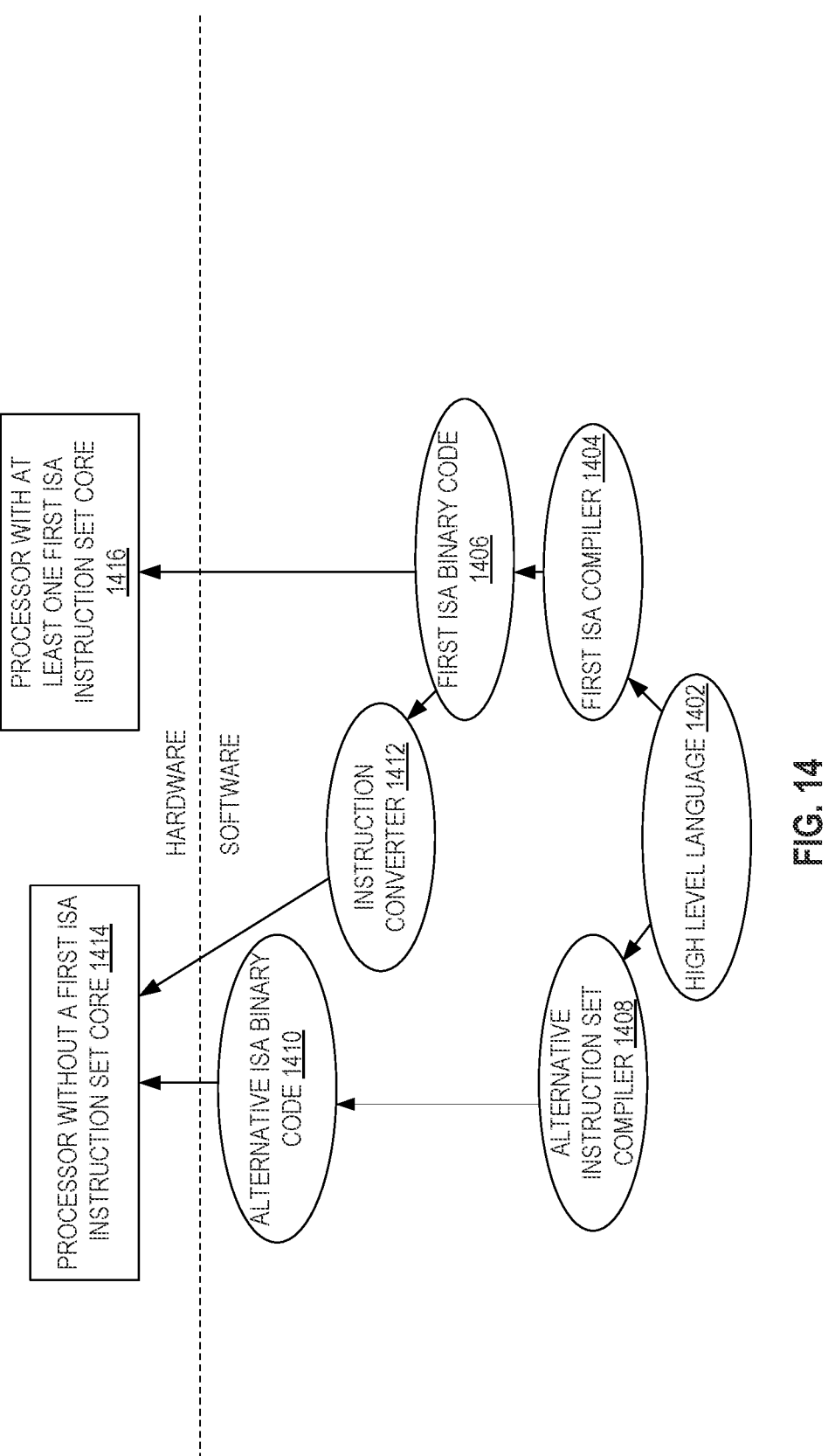
FIG. 14 is a block diagram illustrating the use of a software instruction converter to convert binary instructions in a source instruction set architecture to binary instructions in a target instruction set architecture according to examples.

For example, the circuitry 130 may be incorporated in any of the processors described herein. In particular, the circuitry 130 may be integrated with the processor 800 (FIG. 8), the processor 900, the processor 970, the processor 915, the coprocessor 938, the processor/coprocessor 980 (FIG. 9), the processor 1000 (FIG. 10), the core 1190 (FIG. 11B), the execution units 1162 (FIGS. 11B and 12), and the processor 1416 (FIG. 14). In some examples, the circuitry 130 may be implemented by the instruction fusion circuitry 855 (FIG. 8), and the execution engine 1150 (FIG. 11B). In some examples, the buffer 110 may be implemented by the reservation station 833.

Figure 2A:
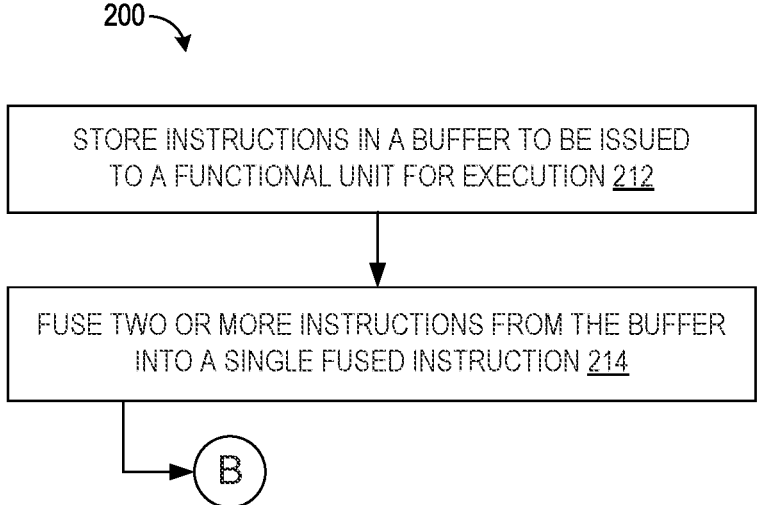

FIGS. 2A to 2B show an example of a method 200 comprising storing instructions in a buffer to be issued to a functional unit for execution at 212, and fusing two or more instructions from the buffer into a single fused instruction at 214. For example, the method 200 may include scanning the buffer to identify two or more instructions from the buffer that are candidates to be fused at 220. In some examples, the method 200 may also include compacting registers of the identified two or more instructions at 230. Some examples of the method 200 may further include reorganizing two or more independent arithmetic instructions from the buffer into a vector format for the single fused instruction at 240.

In some examples, the method 200 may further include issuing the single fused instruction to the functional unit for execution at 250, and/or splitting an output result of the execution of the single fused instruction into two or more respective output results for the fused two or more instructions at 260. In various examples, the instructions may comprise microinstructions at 272, the instructions may comprise arithmetic microinstructions at 274, and/or the instructions may comprise logical micro-operations at 276. In some examples, the buffer may correspond to a reservation station of an out-of-order processor at 278.

For example, the method 200 may be performed by any of the processors described herein. In particular, the method 200 may be performed by the processor 800 (FIG. 8), the processor 900, the processor 970, the processor 915, the coprocessor 938, the processor/coprocessor 980 (FIG. 9), the processor 1000 (FIG. 10), the core 1190 (FIG. 11B), the execution units 1162 (FIGS. 11B and 12), and the processor 1416 (FIG. 14). In some examples, one or more aspects of the method 200 may be performed by the instruction fusion circuitry 855 (FIG. 8), and the execution engine 1150 (FIG. 11B). In some examples, the buffer 110 may be implemented by the reservation station 833.

In some examples, instruction fusion technology may try to combine values from the physical registers of smaller vectors and send the combined values to the execution unit. After execution, the output is written back to the physical registers of the smaller vectors. Advantageously, as compared to vector widening technology, examples of instruction fusion technology do not significantly increase the architectural state footprint (and may also have an advantage in that examples of instruction fusion technology do not have to deal with clobbered registers, etc.).

For some examples of instruction fusion technology, as compared to macro-operation fusion technology, the instruction fusion happens later in the pipeline and involves inspecting the content of the reservation station(s). Because the instruction fusion happens later in the pipeline, some examples may advantageously be able to look at a larger stream of instructions and potentially find more candidates for fusing. Another advantage is that while the type of instructions that can be merged by macro-operation fusion is limited to compare flag-modifying and conditional jump instructions, examples of instruction fusion technology may extend the type of instructions available to merge to a larger set of arithmetic instructions. In some implementations, various of the techniques may not be mutually exclusive and may be combined in a single processor's design. Another advantage is that while macro-operation fusion involves complicated logic to perform dependency checking between instructions (e.g., note that vector widening also requires such dependency checking logic), examples of instruction fusion technology may perform instruction fusion in the reservation station, where dependency checking is already done by the out-of-order engine at that point of the pipeline.

Some examples may look at arithmetic instructions that are waiting to be executed in a reservation station of an out-of-order processor. For the instructions that are waiting to be executed in the reservation station of the out-of-order processor, suitable hardware may determine when the operands of those instructions are ready. Example hardware may then try to combine instructions of the same arithmetic type (e.g., add instructions) by compacting the operands of the instructions to be combined in larger registers. Then, the new fused instruction with the compacted registers is sent to the vector processing unit for execution. At the write-back stage, the output of the fused instruction is written to the output registers of the original instructions. In some examples, instruction fusion technology may involve only modest changes to the hardware (e.g., to support an additional state and a few data selectors/multiplexers). Advantageously, some examples may allow unmodified or poorly vectorized applications to benefit from the vector processing unit. Other advantages may include easier software development, better utilization of the available hardware, and increased performance of some applications.

Figure 3:
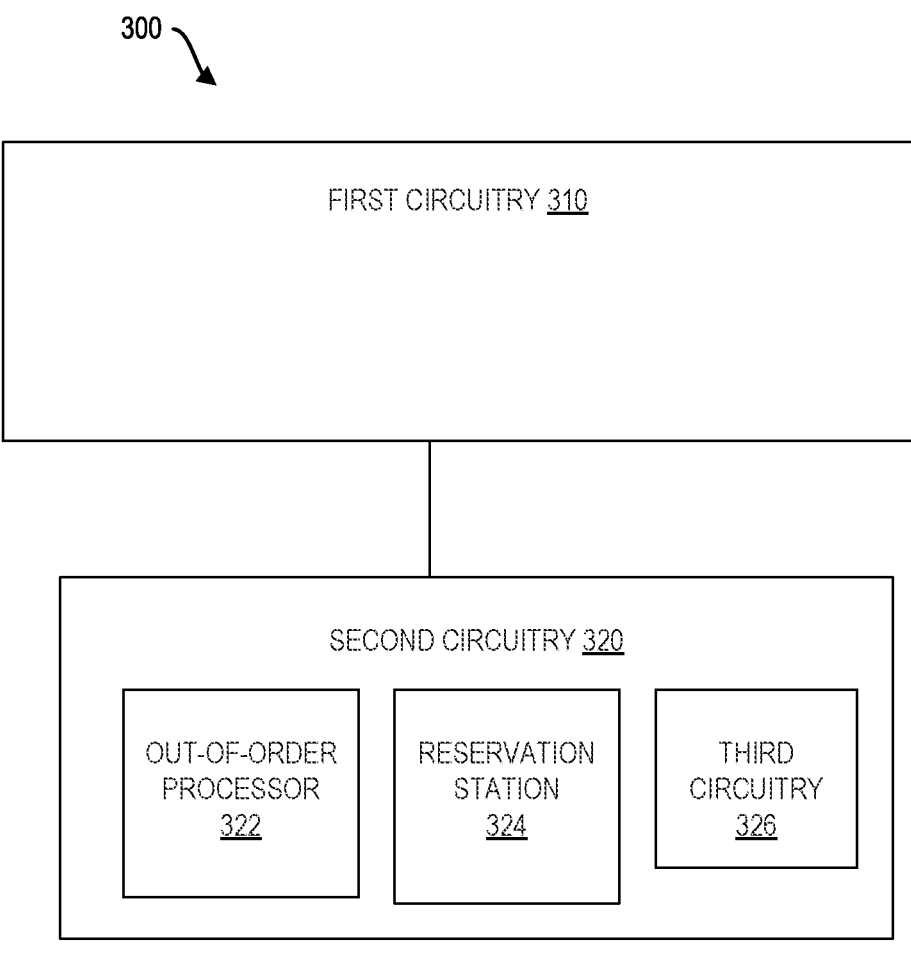
FIG. 3 is a block diagram of another example of an apparatus that includes instruction fusion technology in one implementation.

FIG. 3 is an example of an apparatus 300 comprising first circuitry 310 to decode one or more instructions into microinstructions that correspond to the decoded one or more instructions, and second circuitry 320 coupled to the first circuitry 310 to execute the microinstructions. The second circuitry 320 may include an out-of-order processor 322, a reservation station 324 to store two or more microinstructions that are ready to be executed by the out-of-order processor 322, and third circuitry 326 coupled to the reservation station 324 and the out-of-order processor 322 to fuse two or more arithmetic microinstructions from the reservation station 324 into a single vector instruction. In some examples, the third circuitry 326 may be configured to scan the reservation station 324 to identify two or more arithmetic microinstructions of a same type with no data dependencies, and indicate the identified two or more arithmetic microinstructions as fuse candidates. The third circuitry 326 may be further configured to maintain a data structure of fuse candidates that is indexed by respective opcodes of arithmetic microinstructions.

In some examples, the third circuitry 326 may also be configured to compact two or more operands of the indicated fuse candidates into a register of the single vector instruction. For example, the third circuitry 326 to compact two or more operands of the indicated fuse candidates into the register of the single vector instruction may comprise a data selector to selectively compact respective input operands of the indicated fuse candidates into the register of the single vector instruction. In some examples, the out-of-order processor 322 may include a vector processor, and the third circuitry 326 may be further configured to send the single vector instruction to the vector processor for execution, and to write an output of the single vector instruction into respective output registers of the fused two or more arithmetic microinstructions. In some examples, the first circuitry 310 may correspond to a front-end unit and the second circuitry 320 may correspond to a back-end unit (e.g., a functional unit, an execution unit, an execution engine, etc.).

For example, the first circuitry 310, and/or the second circuitry 320 (e.g., including the out-of-order processor 322, the reservation station 324, and/or the third circuitry 326) may be incorporated in any of the processors described herein. In particular, the first circuitry 310 and the second circuitry 320 may be integrated with the processor 800 (FIG. 8), the processor 900, the processor 970, the processor 915, the coprocessor 938, the processor/coprocessor 980 (FIG. 9), the processor 1000 (FIG. 10), the core 1190 (FIG. 11B), the execution units 1162 (FIGS. 11B and 12), and the processor 1416 (FIG. 14). In some examples, the first circuitry 310 may include one or more of the front-end/decode circuits from FIG. 8. In some examples, the first circuitry 310 may be implemented by the front-end unit circuitry 1130 (FIG. 11). In some examples, the second circuitry 320 may include one or more of the back-end/execution circuits from FIG. 8. In some examples, the second circuitry 320 may be implemented by the back-end execution engine 1150 (FIG. 11).

In an example out-of-order processor, an example reservation station (RS) is a buffer that contains instructions that will be issued to a functional unit for execution. For the instructions in the example reservation station, the hardware knows when the input operands of the instructions are available and, accordingly, when the instructions are ready for execution. Some processor architectures may use a unified reservation station where multiple functional units are connected to the same unified reservation station, while other processors may use a split reservation station where only a subset of the functional units is connected to a particular reservation station.

In some examples, instruction fusion circuitry may constantly scan instructions in the reservation station and tries to match arithmetic instructions from the same type that do not have data dependencies. The instruction fusion circuitry then compacts operands of the matched instructions in a larger register. The instruction fusion circuitry sends a new fused instruction to the functional unit for execution. Because a lot of the work can be done upfront (e.g., a dispatch stage can mark potentially fusible candidate instructions), examples of the instruction fusion circuitry may add only minimal complexity to the instruction scheduler (e.g., usually the most timing-constrained part of an out-of-order processor).

Figure 4:
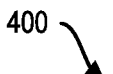
FIG. 4 is an illustrative diagram of another example of an apparatus that includes instruction fusion technology in one implementation.

FIG. 4 shows an example of an apparatus 400 with instruction fusion circuitry 410. The instruction fusion circuitry 410 is coupled to a reservation station 420. At 412, the instruction fusion circuitry 410 is scanning the instructions in the reservation station 420. In this example, the scanning process finds two vaddps instructions in the reservation station 420 that do not have data dependencies and operate on operands with a length of 128 bits. At 414, the instruction fusion circuitry 410 then compacts the operands of the two vaddps instructions in larger registers for a new fused vaddps instruction (e.g., at 416). In this example, the two xmm registers of the original instructions can be compacted into ymm registers with a length of 256 bits. The instruction fusion circuitry 410 then issues the new fused instruction, which operates on the fused registers, to the functional unit for execution. Any suitable technology, circuitry, techniques, etc., may be utilized for the scanning, compacting, fusing, etc., performed by the instruction fusion circuitry 410. Non-limiting examples of suitable circuitry for various aspects of the instruction fusion circuitry 410 are described in more detail below.

Example Circuitry for Scanning a Reservation Station

Figure 5:
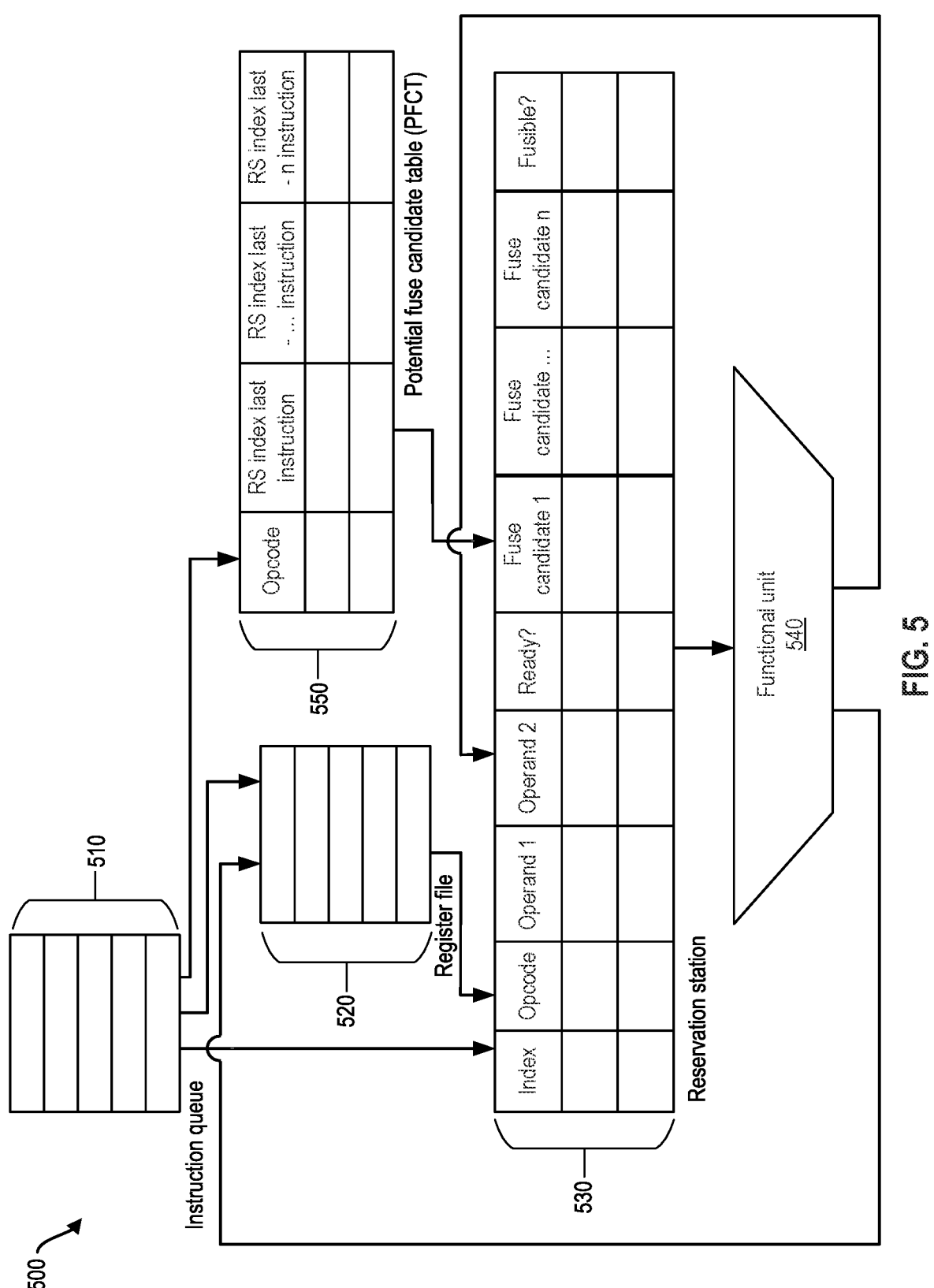
FIG. 5 is a block diagram of an example of dispatch circuitry in one implementation.
Figure 6:
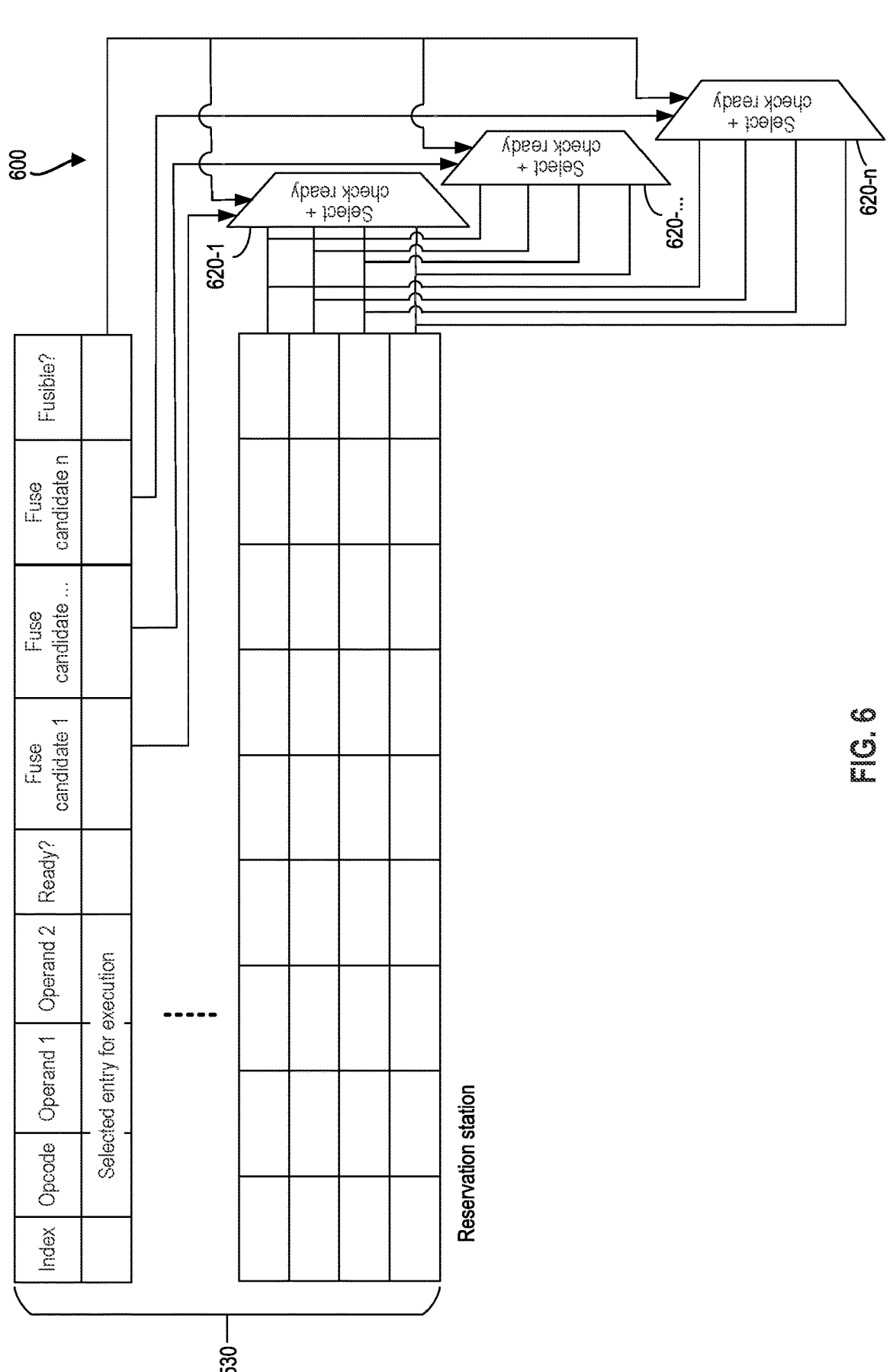
FIG. 6 is a block diagram of an example of selection circuitry in one implementation.

FIGS. 5 and 6 show an example of instruction fusion circuitry to scan a reservation station for instructions that can be fused. FIG. 5 shows an example of dispatch circuitry 500 (e.g., where instructions are issued to the reservation station), and FIG. 6 shows an example of selection circuitry 600 to select instructions from the reservation station to execute on the functional unit.

Example Dispatch Circuitry

As illustrated in FIG. 5, an example of dispatch circuitry 500 includes an instruction queue 510, a register file 520, a reservation station 530, a functional unit 540, and a data structure 550, sometimes referred to herein as potential fuse candidate table (PFCT) 550, coupled as shown. Example entries in the reservation station 530 include fields for an index, an opcode, a first operand (operand 1), a second operand (operand 2), a ready indication, and additional instruction fusion state fields for fuse candidates 1 through n (where n>1) and a field to indicate if the entry is fusible. The example PFCT 550 contains a record per instruction type (e.g., add or multiply instruction), and the opcode of the instruction serves as an index in the table. The PFCT 550 keeps track of the indices of entries from the reservation station 530 of the n-last instructions of that specific instruction type (indicated by the opcode). In some examples, such tracking may be implemented in hardware using a circular buffer. A minimal implementation may set n=1 (so each instruction has only a single potential fuse candidate), which simplifies the circular buffer to a single field. To each entry in the reservation station 530, a list of fuse candidates is added and a fusible flag that indicates if one of the fuse candidates is ready for execution, and therefore can be fused with the current entry of the reservation station 530. The additional instruction fusion state fields in the reservation station 530 and the PFCT 550 provide efficient scanning of the entries of the reservation station 530.

In some examples, a suitable process flow for dispatching instructions from the instruction queue 510 to the reservation station 530 may be as follows: 1) Fetch an instruction from the instruction queue 510; 2) Check the register allocation table to find the physical registers that contain the operands of the instruction; 3) Look up the record for that instruction type in the PFCT 550; 4) Add the new instruction to the reservation station 530; 5) Copy the index of the RS entry of the new instruction to the PFCT record that was selected at number 3 as follows: 5a) Shift all entries in the record by one, meaning the content of 'RS index last instruction' moves to 'RS index last–1 instruction', . . . ; 5b) Put the RS entry index of the new instruction in the field 'RS index last instruction'; 6) Iterate over the values 'RS index last–1 instruction' to 'RS index last–n instruction' for that PFCT record (number 6 will update records in the reservation station 530) as follows: 6a) For each value (the value is an index in the RS), select the corresponding RS entry; 6b) Update the fuse candidates for the entry selected in number 6a as follows: 6b(i) All candidates are shifted by one ('Fuse candidate 1' becomes 'Fuse candidate 2'); and 6b(ii) The content of 'RS index last instruction'(updated in number 5b) is copied to 'Fuse Candidate 1'; and 6c) If one of the fuse candidates has its ready bit set, set fusible to true for the RS entry of number 6a.

Examples of Unified Versus Split Reservation Stations

Examples of an instruction fusion process work for architectures that use a unified or a split reservation station. In the case of a unified reservation station, there will be instructions for multiple functional units in the reservation station, and as a result, the instruction stream can be very diverse. The diverse instruction stream may involve a large PFCT, because the table contains a record for each instruction type that can be fused. Furthermore, because of the diversity in instruction types, fewer instructions of the same type that can be fused may be present at the same time in the reservation station.

In the case of a split reservation station, because the instructions in the reservation stations will be more homogenous, there may be more opportunities for fusing instructions. In the case of spit reservation stations, one example may include one large PFCT, that is then shared over all the reservation stations that are present in the hardware. Fusing instructions across different reservation stations may introduces additional complexities to the hardware. In another example, in the case of split reservation stations, multiple small PFCTs may be provided, where each reservation station has its own private PFCT.

Examples of Selecting Entries from the Reservation Station for Execution

FIG. 6 shows an example of selection circuitry 600 to select instructions from the reservation station 530 to execute on the functional unit. As illustrated in FIG. 6, the reservation station is coupled to n data selectors 620-1 through 620-n (collectively 620), coupled as shown. To feed the functional units with new fused instructions, examples of the hardware may contain a circuit that has the ready bits from all entries in the reservation station 530 as its input, and outputs an identifier for the oldest ready instruction. Instead of selecting only one entry every time, the selection circuitry 600 selects one entry and one or more additional entries to possibly fuse with. Some examples may be configured to fuse only two instructions. Other examples may be extended for fusing three or more instructions. When the selection circuitry 600 selects an entry from the reservation station 530, the data selectors 620 check if the fusible bit is set for that entry. If the fusible bit is set to false, there are no fuse candidates ready and as a result, the instruction cannot be fused with another one. However, if the fusible bit is set to true, then there is a fuse candidate ready for execution, and the instruction fusion circuitry can perform instruction fusion.

Depending on the amount of potential fuse candidates supported by the hardware (e.g., denoted as n in FIG. 6), there are as many data selectors (or multiplexers) 620 added to the selection circuitry 600. Each of these data selectors 620 are connected to all the entries from the reservation station, select a fuse candidate for the selected entry from the reservation station, and check if the ready bit of the fuse candidate is set. If the required conditions are met, the data selectors 620 can quickly find a fuse candidate and provide the execution unit with two or more instructions that can be fused. After providing the execution unit with the fused instruction, both/all entries for the original instructions are then removed from the reservation station 530.

In some examples, the complexity and hardware requirements of instruction fusion scale with the amount of fuse candidates supported by the system (=n). Finding an optimal value for this parameter may depends on other parameters of the architecture. For example, in the case of a small reservation station, a large n-value may not be optimal. Finding an optimal value for n may further depend on an anticipated workload. In general, a small n-value (e.g., 1 or 2) may provide a good trade-off between complexity cost and potential performance improvement. For example, loop-unrolling often leads to a stream of similar instructions, which are mostly independent of each other. Therefore, application with loop-unrolling code may be particularly well-suited to implementations instruction fusion technology as described herein.

Examples of Compacting Operands

Examples of instruction fusion technology may involve putting smaller register values into a large register, sometimes referred to herein as compacting register. In one example, a register compacting implementation may simply copy the content of the small registers into the large register. In some examples, such copying may involve injecting new move instructions to copy the content of the small registers into the large register. In another example, such copying may involve adding hardware for performing data movement between registers. Injecting new move instructions may be impractical or sub-optimal because the instructions are already in the execution stage of the processor at this point, and such an approach may lead to an additional delay before the fused instruction can be executed (e.g., because the move instructions have to be executed first). Similarly, adding hardware for moving content between registers may be complicated and sub-optimal. For example, the added hardware may lead to execution stalls if there is no free large register available. In another example, extensions are added to the read and write ports of the functional unit. The extensions may be relatively low complexity and involve the addition of only two multiplexers and one demultiplexer.

Figure 7:
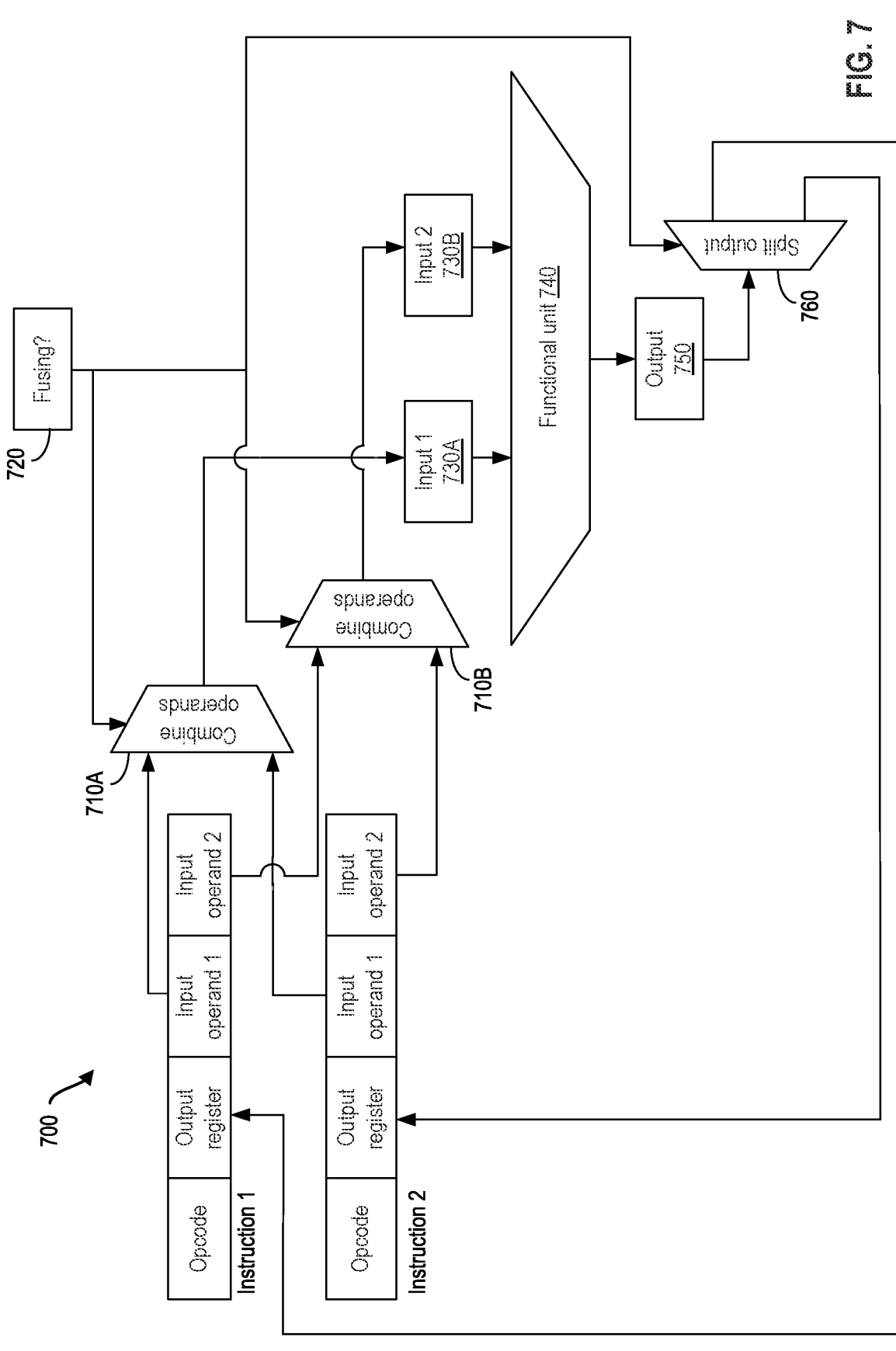
FIG. 7 is a block diagram of an example of instruction fusion circuitry with register compaction circuitry in one implementation.

FIG. 7 show an example of instruction fusion circuitry with register compaction circuitry 700 that includes extensions to hardware for compacting registers. The register compaction circuitry 700 includes multiplexers 710A and 710B, fusing selection circuitry 720, and input registers 730A (Input 1) and 730B (Input 2), coupled as shown to an example two entries (Instruction 1 and Instruction 2) of a reservation station, a functional unit 740, an output register 750, and a demultiplexer 760 (further coupled as shown). For example, when the selection circuitry 600 identifies two entries in the reservation station 530 that can be fused, the input operands of the two identified instructions are combined using the multiplexers 710A and 710B. The multiplexers 710A and 710B are configured to selectively combine operands from the two entries (Instruction 1 and Instruction 2) based on a fusing selection signal provided by the fusing selection circuitry 720.

An example of an internal working of the multiplexers 710A and 710B may be as follows: 1) If the fusing selection signal is set to false, the multiplexers 710A and 710B pass their first input signal, that are the input operands of instruction 1; 2) If the fusing selection signal is set to true, the first multiplexer 710A takes input operand 1 of instruction 1 and input operand 1 of instruction 2 as its input signals and transforms as follows: 2a) The lower part of the output of the multiplexer 710A is copied from input operand 1 of Instruction 1 to the lower part of the input register 730A (Input 1); and 2b) The upper part of the output of the multiplexer 710A is copied from input operand 1 of Instruction 2 to the upper part of the input register 730A (Input 1); and 3) The second multiplexer 710B performs the same operation to input operand 2 of Instruction 1 and Instruction 2 and sends the output as Input 2 to the functional unit 740.

After the functional unit 740 performs an operation on its inputs, the instruction fusion circuitry splits the output if the instruction was fused (e.g., in a write-back stage of the processor's pipeline). An example of an internal working of the demultiplexer 760 that splits the output may be as follows: 1) If the fusing selection signal is set to false, the demultiplexer 760 passes the full width of its input signal to its first output port; As illustrated in FIG. 7, the output register 750 of the functional unit 740 is written to the output register of Instruction 1; The write enable signal for the second output port is inhibited; 2) If the fusing selection signal is set to true, the demultiplexer 760 transforms its input (e.g., from the output register 750 of the functional unit 740) as follows: 2a) Output signal 1 of the demultiplexer 760 is formed by the lower half of the input, and output signal 1 is written to the output register of Instruction 1; 2b) Output signal 2 of the demultiplexer 760 is formed by taking the upper half of the input and shifting its contents to the right, which is then written to the output register of Instruction 2.

Examples of Fused Instructions

In some examples, instruction fusion circuitry may also signal the functional unit to indicate whether the functional unit has to operate on the full length of its inputs or split them in the case of a fused operation. For example, in the case of a full-width addition operation, the functional unit has to know whether the carry bit can be propagated between the lower and upper halves of the data word. In one example, the fusing selection signal from the fusing selection circuitry 720 may be further coupled to the functional unit 740. In another example, one bit in the opcode of the instruction may be reserved that indicates to the functional unit whether the instruction is a fused instruction or not. For operations were both halves are naturally independent (e.g., packed additions or multiplies, where the upper and lower half contain independent vector elements in the case of a wide instruction type) no special handling is required from the functional unit and the reserved bit may be ignored. In some examples, the reserved bit may be set when the operands are compacted. In some examples, the reserved bit may be hidden from software, so programmers cannot exploit the reserved bit and the processor's decoding stage does not become more complicated.

Examples of Exception Handling

If an exception occurs during the execution of a fused instruction, an exception needs to be signaled for each instruction that causes an exception. For example, if the system fuses two divide instructions, and the second one generates a divide by zero exception while the first instruction executed successfully, the system needs to be able to connect the exception to the second instruction. In some examples, an exception vector may be utilized that keeps track of which instruction causes the exception.

The exception vector may contain as many elements as instructions that can be fused. For example, if the hardware has support for fusing two instructions, the exception vector has a length of two. When an exception occurs during the execution of a fused instruction, the functional unit puts the exception identifier at the index in the vector of the instruction that caused the exception. In some examples, both instructions may be re-executed with fusing disabled.

Examples of Branch Miss Handling

In the case that a mispredicted branch occurs, the instructions that are on the wrong path need to be flushed from the processor pipeline. Because some examples of instruction fusion technology do not perform hard merging of instructions (e.g., the instruction fusion does not overwrite or delete instructions, as opposed to e.g., macro-operation fusion), the extra overhead introduced by instruction fusing for flushing instructions from the processor pipeline is rather low.

Figure 8:
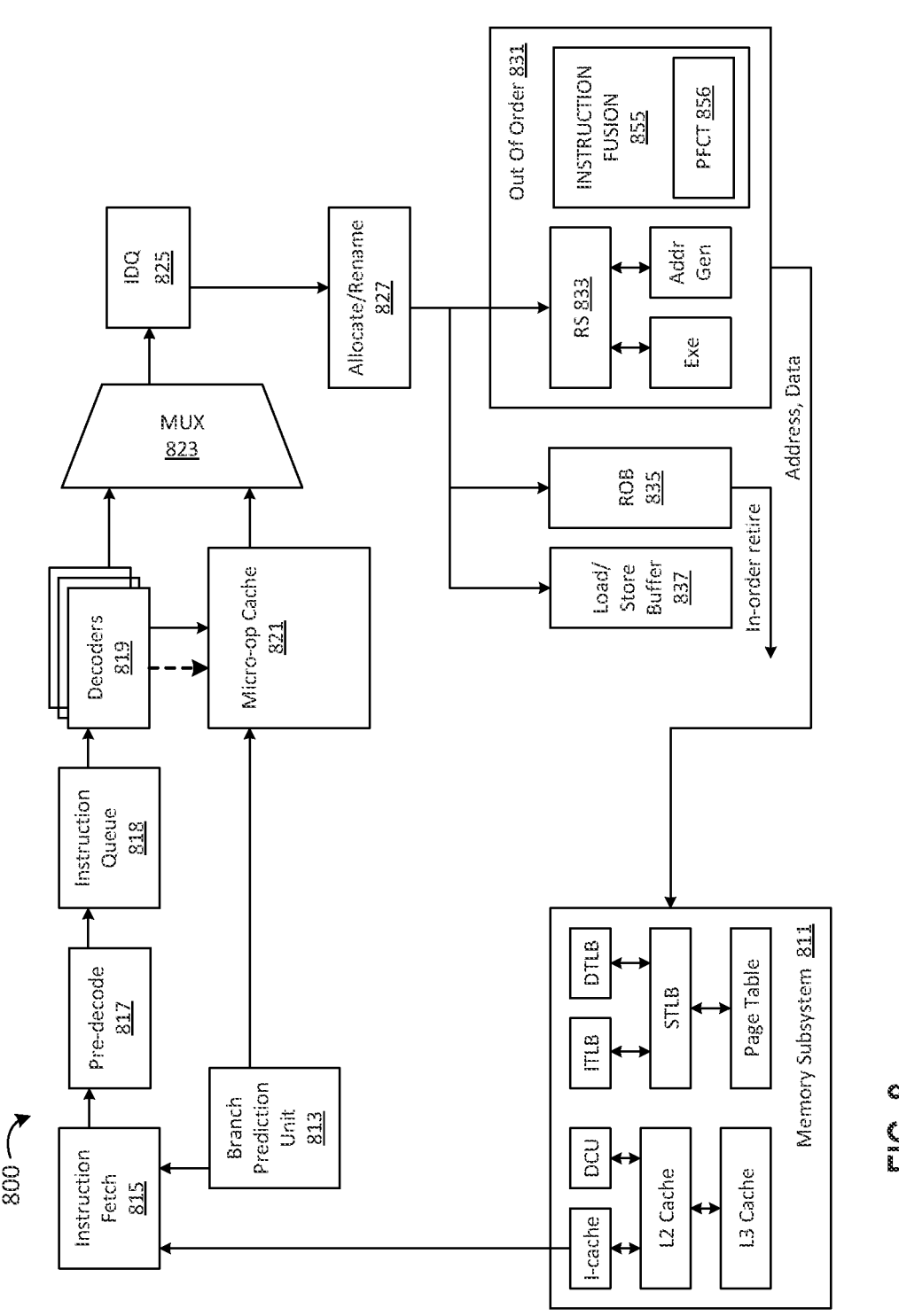
FIG. 8 is a block diagram of an example of an out-of-order in one implementation.

With reference to FIG. 8, an example of an out-of-order (OOO) processor core 800 includes a memory subsystem 811, a branch prediction unit (BPU) 813, an instruction fetch circuit 815, a pre-decode circuit 817, an instruction queue 818, decoders 819, a micro-op cache 821, a mux 823, an instruction decode queue (IDQ) 825, an allocate/rename circuit 827, an out-of-order core 831, a reservation station (RS) 833, a re-order buffer (ROB) 835, and a load/store buffer 837, coupled as shown. The memory subsystem 811 includes a level-1 (L1) instruction cache (I-cache), a L1 data cache (DCU), a L2 cache, a L3 cache, an instruction translation lookaside buffer (ITLB), a data translation lookaside buffer (DTLB), a shared translation lookaside buffer (STLB), and a page table, connected as shown. The OOO core 831 includes the RS 833, an Exe circuit, and an address generation circuit, coupled as shown. In this example, the core 800 may further include instruction fusion circuitry 855 (e.g., that includes a PFCT 856), and other circuitry as described herein, to provide automatic fusion of arithmetic in-flight instructions.

For example, the instruction fusion circuitry 855 may be coupled to the various components of the OOO processor core 800 and microcode/firmware to provide the automatic fusion of arithmetic in-flight instructions. In some examples, instruction fusion circuitry 855 may constantly scan instructions in the RS 833 and try to match arithmetic instructions from the same type that do not have data dependencies. The instruction fusion circuitry 855 then compacts operands of the matched instructions in a larger register. The instruction fusion circuitry 855 sends a new fused instruction to a functional unit (e.g., the Exe circuit) for execution. The instruction fusion circuitry 855 splits the output of the functional unit if the instruction was fused (e.g., in a write-back stage).

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 9:
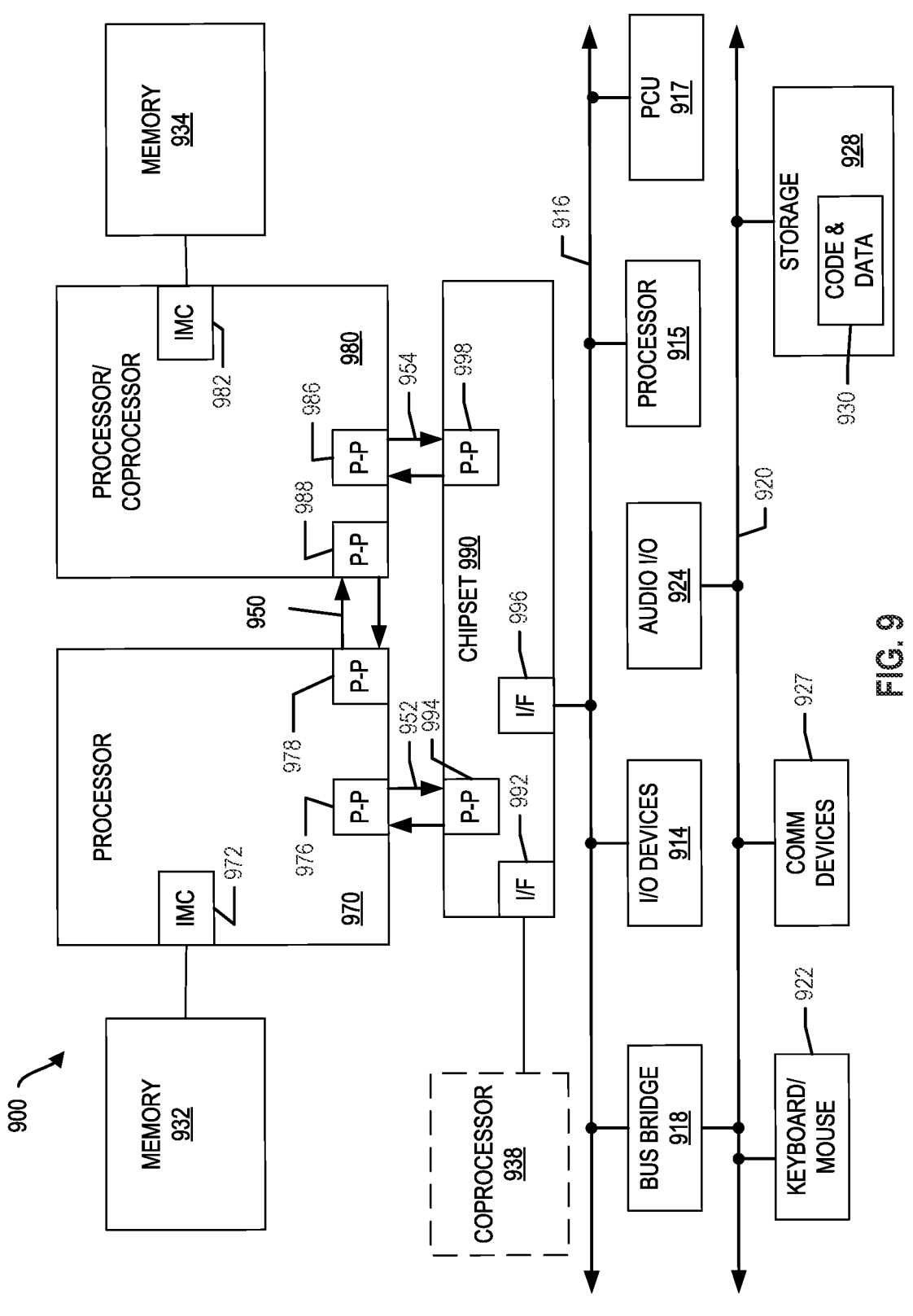
FIG. 9 illustrates an exemplary system.

FIG. 9 illustrates an exemplary system. Multiprocessor system 900 is a point-to-point interconnect system and includes a plurality of processors including a first processor 970 and a second processor 980 coupled via a point-to-point interconnect 950. In some examples, the first processor 970 and the second processor 980 are homogeneous. In some examples, first processor 970 and the second processor 980 are heterogenous. Though the exemplary system 900 is shown to have two processors, the system may have three or more processors, or may be a single processor system.

Processors 970 and 980 are shown including integrated memory controller (IMC) circuitry 972 and 982, respectively. Processor 970 also includes as part of its interconnect controller point-to-point (P-P) interfaces 976 and 978; similarly, second processor 980 includes P-P interfaces 986 and 988. Processors 970, 980 may exchange information via the point-to-point (P-P) interconnect 950 using P-P interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a chipset 990 via individual P-P interconnects 952, 954 using point to point interface circuits 976, 994, 986, 998. Chipset 990 may optionally exchange information with a coprocessor 938 via an interface 992. In some examples, the coprocessor 938 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 970, 980 or outside of both processors, yet connected with the processors via P-P interconnect, such that either or both processors' local cache information may be stored in the shared cache if a processor is placed into a low power mode.

Chipset 990 may be coupled to a first interconnect 916 via an interface 996. In some examples, first interconnect 916 may be a Peripheral Component Interconnect (PCI) interconnect, or an interconnect such as a PCI Express interconnect or another I/O interconnect. In some examples, one of the interconnects couples to a power control unit (PCU) 917, which may include circuitry, software, and/or firmware to perform power management operations with regard to the processors 970, 980 and/or co-processor 938. PCU 917 provides control information to a voltage regulator (not shown) to cause the voltage regulator to generate the appropriate regulated voltage. PCU 917 also provides control information to control the operating voltage generated. In various examples, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other examples, power management operations to be performed by PCU 917 may be implemented externally to a processor, such as by way of a separate power management integrated circuit (PMIC) or another component external to the processor. In yet other examples, power management operations to be performed by PCU 917 may be implemented within BIOS or other system software.

Various I/O devices 914 may be coupled to first interconnect 916, along with a bus bridge 918 which couples first interconnect 916 to a second interconnect 920. In some examples, one or more additional processor(s) 915, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 916. In some examples, second interconnect 920 may be a low pin count (LPC) interconnect. Various devices may be coupled to second interconnect 920 including, for example, a keyboard and/or mouse 922, communication devices 927 and a storage circuitry 928. Storage circuitry 928 may be one or more non-transitory machine-readable storage media as described below, such as a disk drive or other mass storage device which may include instructions/code and data 930 in some examples. Further, an audio I/O 924 may be coupled to second interconnect 920. Note that other architectures than the point-to-point architecture described above are possible. For example, instead of the point-to-point architecture, a system such as multiprocessor system 900 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 10:
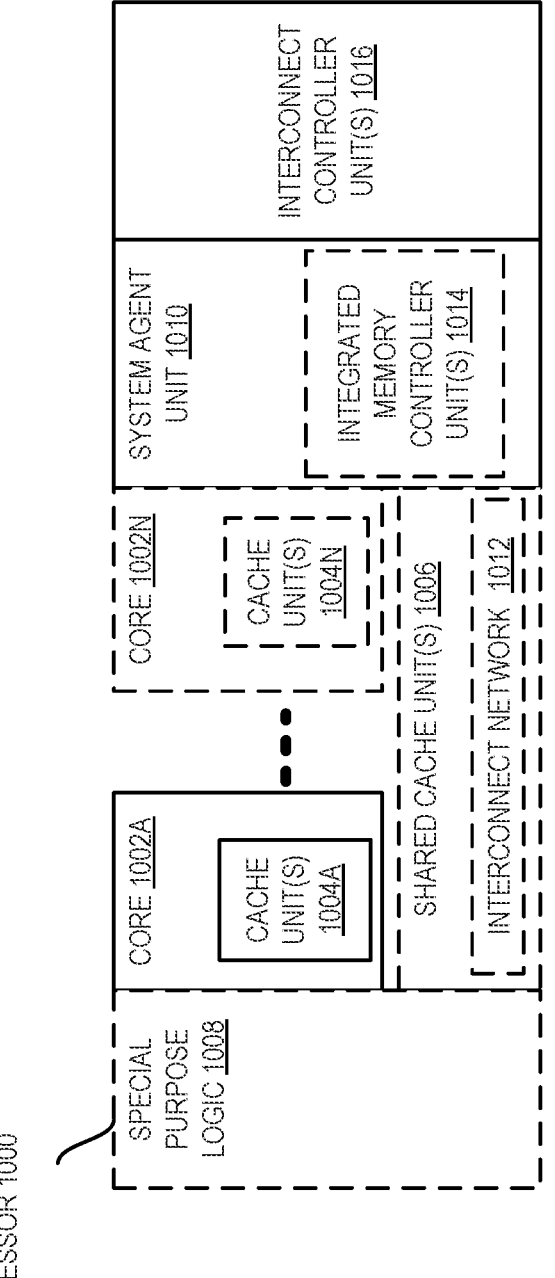
FIG. 10 illustrates a block diagram of an example processor that may have more than one core and an integrated memory controller.

FIG. 10 illustrates a block diagram of an example processor 1000 that may have more than one core and an integrated memory controller. The solid lined boxes illustrate a processor 1000 with a single core 1002A, a system agent unit circuitry 1010, a set of one or more interconnect controller unit(s) circuitry 1016, while the optional addition of the dashed lined boxes illustrates an alternative processor 1000 with multiple cores 1002(A)-(N), a set of one or more integrated memory controller unit(s) circuitry 1014 in the system agent unit circuitry 1010, and special purpose logic 1008, as well as a set of one or more interconnect controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002(A)-(N) being one or more general purpose cores (e.g., general purpose in-order cores, general purpose out-of-order cores, or a combination of the two); 2) a coprocessor with the cores 1002(A)-(N) being a large number of special purpose cores intended primarily for graphics and/or scientific (throughput); and 3) a coprocessor with the cores 1002(A)-(N) being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1004(A)-(N) within the cores 1002(A)-(N), a set of one or more shared cache unit(s) circuitry 1006, and external memory (not shown) coupled to the set of integrated memory controller unit(s) circuitry 1014. The set of one or more shared cache unit(s) circuitry 1006 may include one or more mid-level caches, such as level 2 (L2), level 3 (L3), level 4 (L4), or other levels of cache, such as a last level cache (LLC), and/or combinations thereof. While in some examples ring-based interconnect network circuitry 1012 interconnects the special purpose logic 1008 (e.g., integrated graphics logic), the set of shared cache unit(s) circuitry 1006, and the system agent unit circuitry 1010, alternative examples use any number of well-known techniques for interconnecting such units. In some examples, coherency is maintained between one or more of the shared cache unit(s) circuitry 1006 and cores 1002(A)-(N).

In some examples, one or more of the cores 1002(A)-(N) are capable of multi-threading. The system agent unit circuitry 1010 includes those components coordinating and operating cores 1002(A)-(N). The system agent unit circuitry 1010 may include, for example, power control unit (PCU) circuitry and/or display unit circuitry (not shown). The PCU may be or may include logic and components needed for regulating the power state of the cores 1002(A)-(N) and/or the special purpose logic 1008 (e.g., integrated graphics logic). The display unit circuitry is for driving one or more externally connected displays.

The cores 1002(A)-(N) may be homogenous in terms of instruction set architecture (ISA). Alternatively, the cores 1002(A)-(N) may be heterogeneous in terms of ISA; that is, a subset of the cores 1002(A)-(N) may be capable of executing an ISA, while other cores may be capable of executing only a subset of that ISA or another ISA.

Exemplary Core Architectures—In-Order and Out-of-Order Core Block Diagram.

Figure 11A:
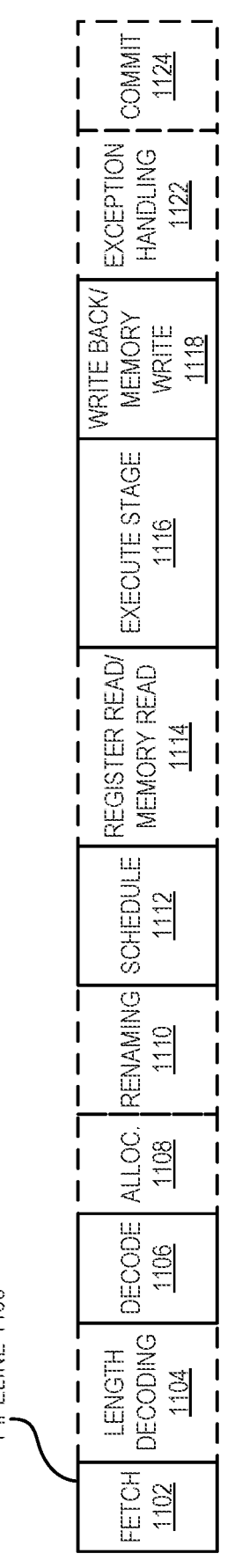
FIG. 11A is a block diagram illustrating both an exemplary in-order pipeline and an exemplary register renaming, out-of-order issue/execution pipeline according to examples.
Figure 11B:
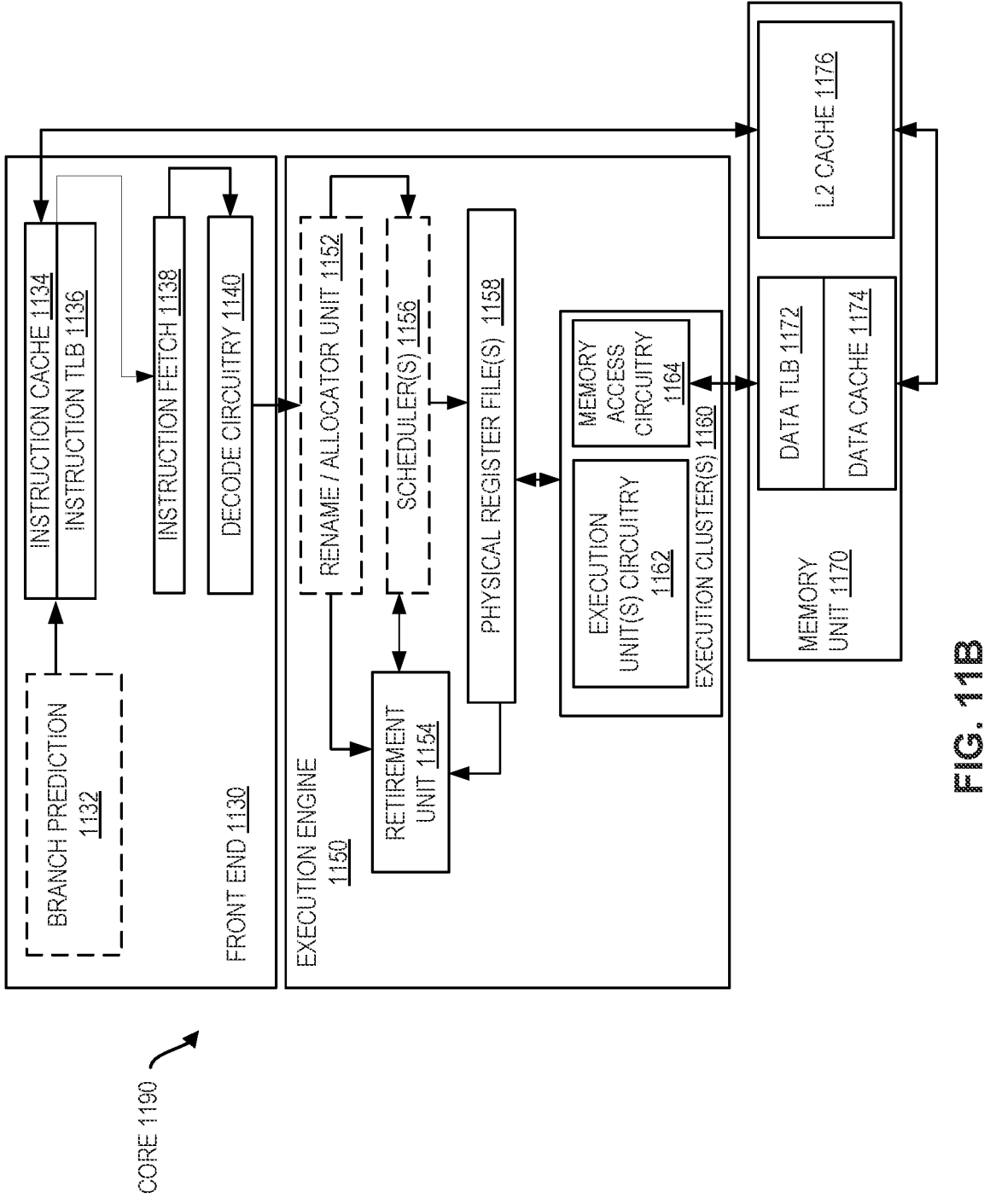
FIG. 11B is a block diagram illustrating both an exemplary example of an in-order architecture core and an exemplary register renaming, out-of-order issue/execution architecture core to be included in a processor according to examples.

FIG. 11A is a block diagram illustrating both an exemplary in-order pipeline and an exemplary register renaming, out-of-order issue/execution pipeline according to examples. FIG. 11B is a block diagram illustrating both an exemplary example of an in-order architecture core and an exemplary register renaming, out-of-order issue/execution architecture core to be included in a processor according to examples. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, an optional length decoding stage 1104, a decode stage 1106, an optional allocation (Alloc) stage 1108, an optional renaming stage 1110, a schedule (also known as a dispatch or issue) stage 1112, an optional register read/memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, and during the decode stage 1106, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1106 and the register read/memory read stage 1114 may be combined into one pipeline stage. In one example, during the execute stage 1116, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 11B may implement the pipeline 1100 as follows: 1) the instruction fetch circuitry 1138 performs the fetch and length decoding stages 1102 and 1104; 2) the decode circuitry 1140 performs the decode stage 1106; 3) the rename/allocator unit circuitry 1152 performs the allocation stage 1108 and renaming stage 1110; 4) the scheduler(s) circuitry 1156 performs the schedule stage 1112; 5) the physical register file(s) circuitry 1158 and the memory unit circuitry 1170 perform the register read/memory read stage 1114; the execution cluster(s) 1160 perform the execute stage 1116; 6) the memory unit circuitry 1170 and the physical register file(s) circuitry 1158 perform the write back/memory write stage 1118; 7) various circuitry may be involved in the exception handling stage 1122; and 8) the retirement unit circuitry 1154 and the physical register file(s) circuitry 1158 perform the commit stage 1124.

FIG. 11B shows a processor core 1190 including front-end unit circuitry 1130 coupled to an execution engine unit circuitry 1150, and both are coupled to a memory unit circuitry 1170. The core 1190 may be a reduced instruction set architecture computing (RISC) core, a complex instruction set architecture computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front-end unit circuitry 1130 may include branch prediction circuitry 1132 coupled to an instruction cache circuitry 1134, which is coupled to an instruction translation lookaside buffer (TLB) 1136, which is coupled to instruction fetch circuitry 1138, which is coupled to decode circuitry 1140. In one example, the instruction cache circuitry 1134 is included in the memory unit circuitry 1170 rather than the front-end unit circuitry 1130. The decode circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1140 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1140 may be implemented using various different mechanisms. Examples of suitable mechanisms include, but are not limited to, look-up tables, hardware implementations, programmable logic arrays (PLAs), microcode read only memories (ROMs), etc. In one example, the core 1190 includes a microcode ROM (not shown) or other medium that stores microcode for certain macroinstructions (e.g., in decode circuitry 1140 or otherwise within the front-end unit circuitry 1130). In one example, the decode circuitry 1140 includes a micro-operation (micro-op) or operation cache (not shown) to hold/cache decoded operations, micro-tags, or micro-operations generated during the decode or other stages of the processor pipeline 1100. The decode circuitry 1140 may be coupled to rename/allocator unit circuitry 1152 in the execution engine circuitry 1150.

The execution engine circuitry 1150 includes the rename/allocator unit circuitry 1152 coupled to a retirement unit circuitry 1154 and a set of one or more scheduler(s) circuitry 1156. The scheduler(s) circuitry 1156 represents any number of different schedulers, including reservations stations, central instruction window, etc. In some examples, the scheduler(s) circuitry 1156 can include arithmetic logic unit (ALU) scheduler/scheduling circuitry, ALU queues, arithmetic generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1158 includes vector registers unit circuitry, write-mask registers unit circuitry, and scalar register unit circuitry. These register units may provide architectural vector registers, vector mask registers, general-purpose registers, etc. The physical register file(s) circuitry 1158 is coupled to the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1154 and the physical register file(s) circuitry 1158 are coupled to the execution cluster(s) 1160. The execution cluster(s) 1160 includes a set of one or more execution unit(s) circuitry 1162 and a set of one or more memory access circuitry 1164. The execution unit(s) circuitry 1162 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1156, physical register file(s) circuitry 1158, and execution cluster(s) 1160 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1164). It should also be understood that where separate pipelines are used, one or more of these pipelines may be out-of-order issue/execution and the rest in-order.

In some examples, the execution engine unit circuitry 1150 may perform load store unit (LSU) address/data pipelining to an Advanced Microcontroller Bus (AMB) interface (not shown), and address phase and writeback, data phase load, store, and branches.

The set of memory access circuitry 1164 is coupled to the memory unit circuitry 1170, which includes data TLB circuitry 1172 coupled to a data cache circuitry 1174 coupled to a level 2 (L2) cache circuitry 1176. In one exemplary example, the memory access circuitry 1164 may include a load unit circuitry, a store address unit circuit, and a store data unit circuitry, each of which is coupled to the data TLB circuitry 1172 in the memory unit circuitry 1170. The instruction cache circuitry 1134 is further coupled to the level 2 (L2) cache circuitry 1176 in the memory unit circuitry 1170. In one example, the instruction cache 1134 and the data cache 1174 are combined into a single instruction and data cache (not shown) in L2 cache circuitry 1176, a level 3 (L3) cache circuitry (not shown), and/or main memory. The L2 cache circuitry 1176 is coupled to one or more other levels of cache and eventually to a main memory.

The core 1190 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1190 includes logic to support a packed data instruction set architecture extension (e.g., AVX1, AVX2), thereby allowing the operations used by many multimedia applications to be performed using packed data.

Exemplary Execution Unit(s) Circuitry.

Figure 12:
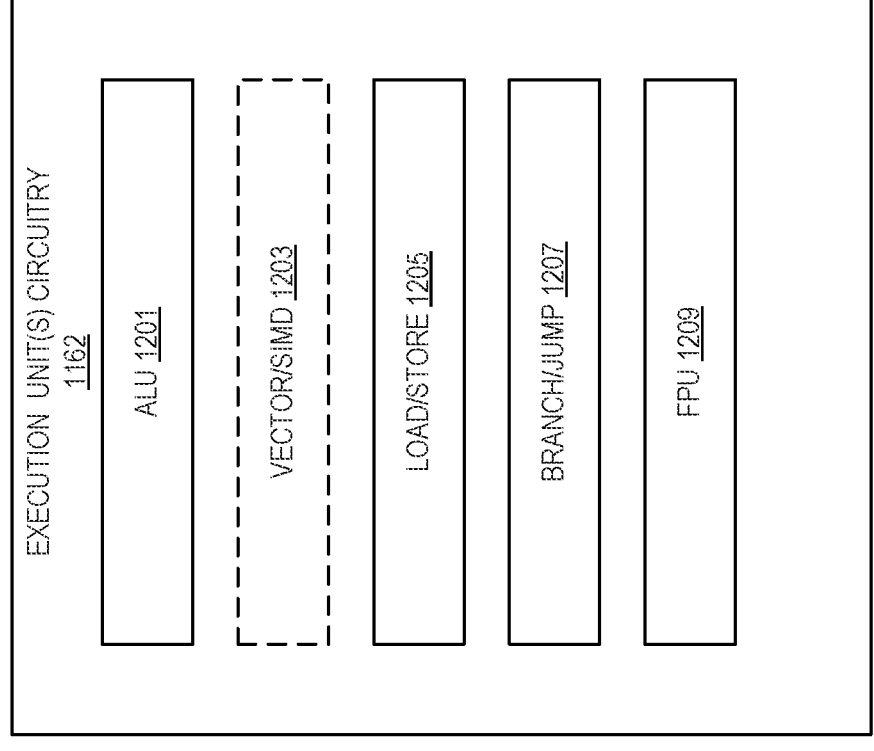
FIG. 12 illustrates examples of execution unit(s) circuitry.

FIG. 12 illustrates examples of execution unit(s) circuitry, such as execution unit(s) circuitry 1162 of FIG. 11B. As illustrated, execution unit(s) circuitry 1162 may include one or more ALU circuits 1201, optional vector/single instruction multiple data (SIMD) circuits 1203, load/store circuits 1205, branch/jump circuits 1207, and/or Floating-point unit (FPU) circuits 1209. ALU circuits 1201 perform integer arithmetic and/or Boolean operations. Vector/SIMD circuits 1203 perform vector/SIMD operations on packed data (such as SIMD/vector registers). Load/store circuits 1205 execute load and store instructions to load data from memory into registers or store from registers to memory. Load/store circuits 1205 may also generate addresses. Branch/jump circuits 1207 cause a branch or jump to a memory address depending on the instruction. FPU circuits 1209 perform floating-point arithmetic. The width of the execution unit(s) circuitry 1162 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

FIG. 13 is a block diagram of a register architecture 1300 according to some examples. As illustrated, the register architecture 1300 includes vector/SIMD registers 1310 that vary from 128-bit to 1,024 bits width. In some examples, the vector/SIMD registers 1310 are physically 512-bits and, depending upon the mapping, only some of the lower bits are used. For example, in some examples, the vector/SIMD registers 1310 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1300 includes writemask/predicate registers 1315. For example, in some examples, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1315 corresponds to a data element position of the destination. In other examples, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1300 includes scalar floating-point (FP) register 1345 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some examples, the one or more flag registers 1340 are called program status and control registers.

Segment registers 1320 contain segment points for use in accessing memory. In some examples, these registers are referenced by the names CS, DS, SS, ES, FS, and GS.

Machine specific registers (MSRs) 1335 control and report on processor performance. Most MSRs 1335 handle system-related functions and are not accessible to an application program. Machine check registers 1360 consist of control, status, and error reporting MSRs that are used to detect and report on hardware errors.

One or more instruction pointer register(s) 1330 store an instruction pointer value. Control register(s) 1355 (e.g., CR0-CR4) determine the operating mode of a processor (e.g., processor 970, 980, 938, 915, and/or 1000) and the characteristics of a currently executing task. Debug registers 1350 control and allow for the monitoring of a processor or core's debugging operations.

Memory (mem) management registers 1365 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1300 may, for example, be used in a register file/memory, or physical register file(s) circuitry 1158.

Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 14 shows a program in a high-level language 1402 may be compiled using a first ISA compiler 1404 to generate first ISA binary code 1406 that may be natively executed by a processor with at least one first instruction set architecture core 1416. The processor with at least one first ISA instruction set architecture core 1416 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1404 represents a compiler that is operable to generate first ISA binary code 1406 (e.g., object code) that can, with or without additional linkage processing, be executed on the processor with at least one first ISA instruction set architecture core 1416. Similarly, FIG. 14 shows the program in the high-level language 1402 may be compiled using an alternative instruction set architecture compiler 1408 to generate alternative instruction set architecture binary code 1410 that may be natively executed by a processor without a first ISA instruction set architecture core 1414. The instruction converter 1412 is used to convert the first ISA binary code 1406 into code that may be natively executed by the processor without a first ISA instruction set architecture core 1414. This converted code is not necessarily to be the same as the alternative instruction set architecture binary code 1410; however, the converted code will accomplish the general operation and be made up of instructions from the alternative instruction set architecture. Thus, the instruction converter 1412 represents software, firmware, hardware, or a combination thereof that, through emulation, simulation or any other process, allows a processor or other electronic device that does not have a first ISA instruction set architecture processor or core to execute the first ISA binary code 1406.

Techniques and architectures for automatic fusion of arithmetic in-flight instructions are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description

ADDITIONAL NOTES AND EXAMPLES

Example 1 includes an apparatus comprising a buffer to store instructions to be issued to a functional unit for execution, and circuitry coupled to the buffer to combine two or more instructions from the buffer into a single combined instruction.

Example 2 includes the apparatus of Example 1, wherein the circuitry is further to scan the buffer to identify two or more instructions from the buffer that are suitable to be combined.

Example 3 includes the apparatus of any of Examples 1 to 2, wherein the circuitry is further to compact registers of the combined two or more instructions.

Example 4 includes the apparatus of any of Examples 1 to 3, wherein the circuitry is further to reorganize two or more independent arithmetic instructions from the buffer into a vector format for the single combined instruction.

Example 5 includes the apparatus of any of Examples 1 to 4, wherein the circuitry is further to issue the single combined instruction to the functional unit for execution.

Example 6 includes the apparatus of Example 5, wherein the circuitry is further to split an output result of the execution of the single combined instruction into two or more respective output results for the combined two or more instructions.

Example 7 includes the apparatus of any of Examples 1 to 6, wherein the instructions comprise microinstructions.

Example 8 includes the apparatus of any of Examples 1 to 7, wherein the instructions comprise arithmetic microinstructions.

Example 9 includes the apparatus of any of Examples 1 to 8, wherein the instructions comprise logical micro-operations.

Example 10 includes the apparatus of any of Examples 1 to 9, wherein the buffer corresponds to a reservation station of an out-of-order processor.

Example 11 includes a method comprising storing instructions in a buffer to be issued to a functional unit for execution, and fusing two or more instructions from the buffer into a single fused instruction.

Example 12 includes the method of Example 11, further comprising scanning the buffer to identify two or more instructions from the buffer that are candidates to be fused.

Example 13 includes the method of any of Examples 11 to 12, further comprising compacting registers of the identified two or more instructions.

Example 14 includes the method of any of Examples 11 to 13, further comprising reorganizing two or more independent arithmetic instructions from the buffer into a vector format for the single fused instruction.

Example 15 includes the method of any of Examples 11 to 14, further comprising issuing the single fused instruction to the functional unit for execution.

Example 16 includes the method of Example 15, further comprising splitting an output result of the execution of the single fused instruction into two or more respective output results for the fused two or more instructions.

Example 17 includes the method of any of Examples 11 to 16, wherein the instructions comprise microinstructions.

Example 18 includes the method of any of Examples 11 to 17, wherein the instructions comprise arithmetic microinstructions.

Example 19 includes the method of any of Examples 11 to 18, wherein the instructions comprise logical micro-operations.

Example 20 includes the method of any of Examples 11 to 19, wherein the buffer corresponds to a reservation station of an out-of-order processor.

Example 21 includes an apparatus comprising first circuitry to decode one or more instructions into microinstructions that correspond to the decoded one or more instructions, and second circuitry coupled to the front-end unit to execute the microinstructions, the second circuitry including an out-of-order processor, a reservation station to store two or more microinstructions that are ready to be executed by the out-of-order processor, and third circuitry coupled to the reservation station and the out-of-order processor to fuse two or more arithmetic microinstructions from the reservation station into a single vector instruction.

Example 22 includes the apparatus of Example 21, wherein the third circuitry is further to scan the reservation station to identify two or more arithmetic microinstructions of a same type with no data dependencies, and indicate the identified two or more arithmetic microinstructions as fuse candidates.

Example 23 includes the apparatus of Example 22, wherein the third circuitry is further to maintain a data structure of fuse candidates that is indexed by respective opcodes of arithmetic microinstructions.

Example 24 includes the apparatus of any of Examples 22 to 23, wherein the third circuitry is further to compact two or more operands of the indicated fuse candidates into a register of the single vector instruction.

Example 25 includes the apparatus of Example 24, wherein the third circuitry to compact two or more operands of the indicated fuse candidates into the register of the single vector instruction comprises a data selector to selectively compact respective input operands of the indicated fuse candidates into the register of the single vector instruction.

Example 26 includes the apparatus of any of Examples 24 to 25, wherein the out-of-order processor includes a vector processor, and wherein the third circuitry is further to send the single vector instruction to the vector processor for execution.

Example 27 includes the apparatus of Example 26, wherein the third circuitry is further to write an output of the single vector instruction into respective output registers of the fused two or more arithmetic microinstructions.

Example 28 includes the apparatus of any of Examples 21 to 26, wherein the first circuitry corresponds to a front-end unit and the second circuitry corresponds to a back-end unit.

Example 29 includes an apparatus comprising means for storing instructions in a buffer to be issued to a functional unit for execution, and means for fusing two or more instructions from the buffer into a single fused instruction.

Example 30 includes the apparatus of Example 29, further comprising means for scanning the buffer to identify two or more instructions from the buffer that are candidates to be fused.

Example 31 includes the apparatus of any of Examples 29 to 30, further comprising means for compacting registers of the identified two or more instructions.

Example 32 includes the apparatus of any of Examples 29 to 31, further comprising means for reorganizing two or more independent arithmetic instructions from the buffer into a vector format for the single fused instruction.

Example 33 includes the apparatus of any of Examples 29 to 32, further comprising means for issuing the single fused instruction to the functional unit for execution.

Example 34 includes the apparatus of Example 33, further comprising means for splitting an output result of the execution of the single fused instruction into two or more respective output results for the fused two or more instructions.

Example 35 includes the apparatus of any of Examples 29 to 34, wherein the instructions comprise microinstructions.

Example 36 includes the apparatus of any of Examples 29 to 35, wherein the instructions comprise arithmetic microinstructions.

Example 37 includes the apparatus of any of Examples 29 to 36, wherein the instructions comprise logical micro-operations.

Example 38 includes the apparatus of any of Examples 29 to 37, wherein the buffer corresponds to a reservation station of an out-of-order processor.

Example 39 includes at least one non-transitory one machine readable medium comprising a plurality of instructions that, in response to being executed on a computing device, cause the computing device to store instructions in a buffer to be issued to a functional unit for execution, and fuse two or more instructions from the buffer into a single fused instruction.

Example 40 includes the at least one non-transitory one machine readable medium of Example 39, comprising a plurality of further instructions that, in response to being executed on the computing device, cause the computing device to scan the buffer to identify two or more instructions from the buffer that are candidates to be fused.

Example 41 includes the at least one non-transitory one machine readable medium of any of Examples 39 to 40, comprising a plurality of further instructions that, in response to being executed on the computing device, cause the computing device to compact registers of the identified two or more instructions.

Example 42 includes the at least one non-transitory one machine readable medium of any of Examples 39 to 41, comprising a plurality of further instructions that, in response to being executed on the computing device, cause the computing device to reorganize two or more independent arithmetic instructions from the buffer into a vector format for the single fused instruction.

Example 43 includes the at least one non-transitory one machine readable medium of any of Examples 39 to 42, comprising a plurality of further instructions that, in response to being executed on the computing device, cause the computing device to issue the single fused instruction to the functional unit for execution.

Example 44 includes the at least one non-transitory one machine readable medium of Example 43, comprising a plurality of further instructions that, in response to being executed on the computing device, cause the computing device to split an output result of the execution of the single fused instruction into two or more respective output results for the fused two or more instructions.

Example 45 includes the at least one non-transitory one machine readable medium of any of Examples 39 to 44, wherein the instructions comprise microinstructions.

Example 46 includes the at least one non-transitory one machine readable medium of any of Examples 39 to 45, wherein the instructions comprise arithmetic microinstructions.

Example 47 includes the at least one non-transitory one machine readable medium of any of Examples 39 to 46, wherein the instructions comprise logical micro-operations.

Example 48 includes the at least one non-transitory one machine readable medium of any of Examples 39 to 47, wherein the buffer corresponds to a reservation station of an out-of-order processor.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
a buffer to store instructions to be issued to a functional unit for execution; and
circuitry coupled to the buffer, the circuitry to:
maintain multiple records which are each to correspond to a different respective instruction type of multiple instruction types, wherein the multiple records are each to indicate a respective one or more most recent instructions of the corresponding instruction type, wherein the circuitry to maintain the multiple records comprises the circuitry to perform a first update of a first record of the multiple records;
maintain multiple lists which are each to correspond to a different respective entry of multiple entries of a reservation station, wherein the multiple entries are each to correspond to a different respective instruction, wherein each list of the multiple lists is to comprise one or more identifiers each of a respective instruction which is classified as a potential candidate to be combined with the instruction which corresponds to the entry, wherein the circuitry to maintain the multiple lists comprises the circuitry to perform, after the first update, a second update of one or more of the multiple lists based on the first record;
perform an access of the one or more of the multiple lists; and
based on the access, combine two or more instructions from the buffer into a single combined instruction.

2. The apparatus of claim 1, wherein the circuitry is further to:
scan the buffer to identify two or more instructions from the buffer that are suitable to be combined.

3. The apparatus of claim 1, wherein the circuitry is to:
compact registers of the combined two or more instructions.

4. The apparatus of claim 1, wherein the circuitry is to:
reorganize two or more independent arithmetic instructions from the buffer into a vector format for the single combined instruction.

5. The apparatus of claim 1, wherein the circuitry is further to:
issue the single combined instruction to the functional unit for execution.

6. The apparatus of claim 5, wherein the circuitry is further to:
split an output result of the execution of the single combined instruction into two or more respective output results for the combined two or more instructions.

7. The apparatus of claim 1, wherein the instructions comprise one or more of microinstructions, arithmetic microinstructions, and logical micro-operations.

8. The apparatus of claim 1, wherein the multiple entries of the reservation station each comprise a respective list of the multiple lists.

9. A method comprising:
storing instructions in a buffer to be issued to a functional unit for execution;
maintaining multiple records which each correspond to a different respective instruction type of multiple instruction types, wherein the multiple records each indicate a respective one or more most recent instructions of the corresponding instruction type, wherein maintaining the multiple records comprises performing a first update of a first record of the multiple records;

maintaining multiple lists which each correspond to a different respective entry of multiple entries of a reservation station, wherein the multiple entries each correspond to a different respective instruction, wherein each list of the multiple lists comprises one or more identifiers each of a respective instruction which is classified as a potential candidate to be fused with an instruction which corresponds to the entry, wherein maintaining the multiple lists comprises performing, after the first update, a second update of one or more of the multiple lists based on the first record;

performing an access of the one or more of the multiple lists; and based on the access, fusing two or more instructions from the buffer into a single fused instruction.

10. The method of claim 9, further comprising:

scanning the buffer to identify two or more instructions from the buffer that are candidates to be fused.

11. The method of claim 9, wherein fusing the two or more instructions comprises compacting registers of the identified two or more instructions.

12. The method of claim 9, wherein fusing the two or more instructions comprises reorganizing two or more independent arithmetic instructions from the buffer into a vector format for the single fused instruction.

13. The method of claim 9, further comprising:

issuing the single fused instruction to the functional unit for execution.

14. The method of claim 13, further comprising:

splitting an output result of the execution of the single fused instruction into two or more respective output results for the fused two or more instructions.

15. An apparatus comprising:

first circuitry to decode one or more instructions into microinstructions that correspond to the decoded one or more instructions; and second circuitry coupled to a front-end unit to execute the microinstructions, the second circuitry including:

an out-of-order processor, a reservation station to store two or more microinstructions that are ready to be executed by the out-of-order processor, and third circuitry coupled to the reservation station and the out-of-order processor, the third circuitry to:

maintain multiple records which are each to correspond to a different respective instruction type of multiple instruction types, wherein the multiple records are each to indicate a respective one or more most recent instructions of the corresponding instruction type, wherein the third circuitry to maintain the multiple records comprises the third circuitry to perform a first update of a first record of the multiple records;

maintain multiple lists which are each to correspond to a different respective entry of multiple entries of the reservation station, wherein the multiple entries are each to correspond to a different respective microinstruction, wherein each list of the multiple lists is to comprise one or more identifiers each of a respective microinstruction which is classified as a potential candidate to be fused with the microinstruction which corresponds to the entry, wherein the third circuitry to maintain the multiple lists comprises the third circuitry to perform, after the first update, a second update of one or more of the multiple lists based on the first record;

perform an access of the one or more of the multiple lists; and based on the access, fuse two or more arithmetic microinstructions from the reservation station into a single vector instruction.

16. The apparatus of claim 15, wherein the third circuitry is further to:

scan the reservation station to identify two or more arithmetic microinstructions of a same type with no data dependencies; and indicate the identified two or more arithmetic microinstructions as fuse candidates.

17. The apparatus of claim 16, wherein the multiple entries of the reservation station each comprise a respective list of the multiple lists.

18. The apparatus of claim 16, wherein the third circuitry is to:

compact two or more operands of the indicated fuse candidates into a register of the single vector instruction.

19. The apparatus of claim 18, wherein the third circuitry to compact two or more operands of the indicated fuse candidates into the register of the single vector instruction comprises:

a data selector to selectively compact respective input operands of the indicated fuse candidates into the register of the single vector instruction.

20. The apparatus of claim 18, wherein the out-of-order processor includes a vector processor, and wherein the third circuitry is further to:

send the single vector instruction to the vector processor for execution.

21. The apparatus of claim 20, wherein the third circuitry is further to:

write an output of the single vector instruction into respective output registers of the fused two or more arithmetic microinstructions.

22. The apparatus of claim 15, wherein the first circuitry corresponds to the front-end unit and the second circuitry corresponds to a back-end unit.

* * * * *